United States Patent [19]
Chang

[11] Patent Number: 5,544,373
[45] Date of Patent: Aug. 13, 1996

[54] AIR CUSHION FOR SLEEPING IN A CAR

[76] Inventor: Yung-Yi Chang, No. 664, Sec. 2, Shan-Chiao Rd., Tien-Chung Chen, Changua Hsien, Taiwan

[21] Appl. No.: 420,366

[22] Filed: Apr. 11, 1995

[51] Int. Cl.⁶ .................................................. A47C 27/10
[52] U.S. Cl. .................................. 5/118; 5/902; 5/710
[58] Field of Search ................................. 5/94, 118, 449, 5/455, 900.5, 902

[56] References Cited

U.S. PATENT DOCUMENTS

| | | | |
|---|---|---|---|
| 2,604,641 | 7/1952 | Reed | 5/455 |
| 2,614,272 | 10/1952 | Morner | 5/455 |
| 2,648,072 | 8/1953 | De Blieux | 5/455 X |
| 2,676,337 | 4/1954 | Soeder | 5/94 |
| 3,648,306 | 3/1972 | Auerbach | 5/118 X |
| 3,696,449 | 10/1972 | Smith | 5/118 |
| 5,185,846 | 2/1993 | Bonda | 5/118 |
| 5,333,336 | 8/1994 | Langsam | 5/449 X |

Primary Examiner—Michael F. Trettel

[57] ABSTRACT

An air cushion for sleeping in a car includes a plastic lower layer, a plastic intermediate layer, a plastic upper layer, a plastic mattress, and a flannel cloth, having their edge portions fastened together so as to provide an enlarged and comfortable flat sleeping space. The plastic lower layer and the intermediate layer form a first chamber, while the plastic intermediate layer and the upper layer define a second chamber which is separated from the first chamber to preclude air circulation between the first and second chambers having the two chambers inflated for resting the lower layer on the car seats, and with the air cushion having an area covering a driver's seat and a passenger's seat to provide a flat surface on the car seat for sleeping use.

1 Claim, 3 Drawing Sheets

AIR CUSHION FOR SLEEPING IN A CAR

BACKGROUND OF THE INVENTION

The present invention relates to an air cushion, especially to an air-cushion flat on the surface and stretching across from the driver's seat to the passenger's seat in the front of a car to provide a comfortable and spacious area for sleeping.

Cars are widely used as traveling means. Although some car seats are able to be adjusted in such a way as to provide a sleeping area for those peopele who have to take a rest or spend their night in a car, the design of a conventional car yet makes this sleeping area rugged and uneven, unsuitable for people who are used to sleep comfortably on a flat surface. To provide a car-used air cushion for comfortable sleeping on an enlarged and flat surface is thus an useful implement, especially for those long-distance travellers.

SUMMARY OF THE INVENTION

It is, therefore, the primary object of the present invention to provide an air cushion for use in a car, including a plastic lower layer at the bottom, a plastic intermediate layer in the middle, a plastic upper layer at the top and a plastic mattress and a flannel cloth on the surface of the top having the edge portions of the plural layers, the plastic mattress and the flannel cloth fastened together by adhesive so as to provide an enlarged and comfortable space in car for use of sleeping. Two valves are each formed on a side portion of the plastic lower and upper layers for inflating or deflating the air cushion. The plastic intermediate layer and the upper layer are fastened together, having multiple air chambers defined between the intermediate layer and the upper layer, while the shape of the plastic lower layer is designed in conformance to that of the car seats so as to fitly mount the plastic lower layer on the car seat. Also a seat holding portion is protruded rearwardly downwardly from the air cushion to retain the seats so as to avoid the lurching of the air cushion. A rectangular extension portion is protruded forwardly from the air cushion adjacent to a front end of the passenger's seat to provide an extra space for the stretching of the user's feet. Moreover, the air cushion is designed to cover the area from the driver's seat to the passenger's seat. While inflated with air, the air cushion in a car can be extended from the driver's seat to the passenger's seat to provide an enlarged and comfortable flat sleeping space.

DETAILED DESCRIPTION OF THE PREFERRED EMBODIMENT

Figure 1:
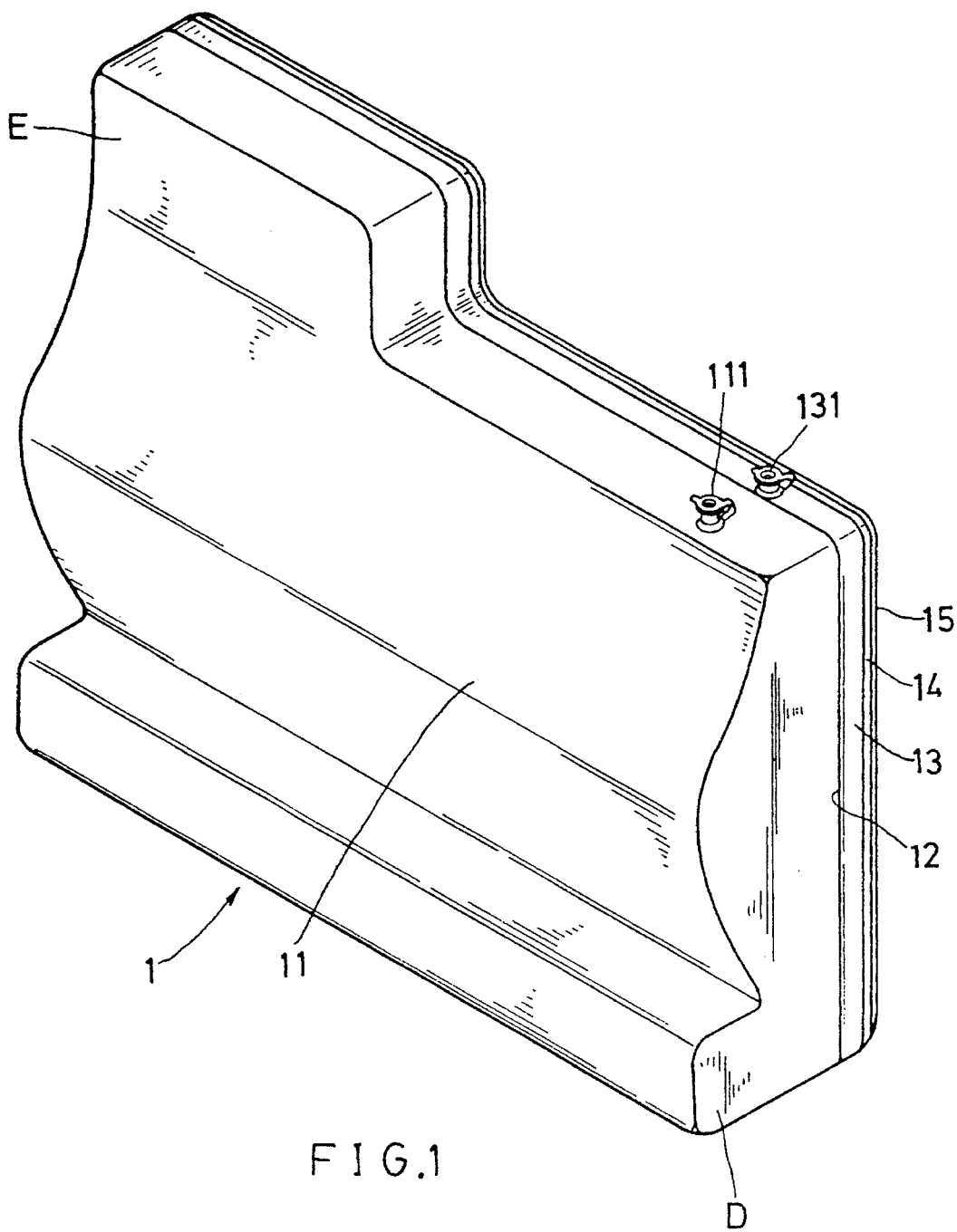
FIG. 1 is a perspective view of the present invention.
Figure 2:
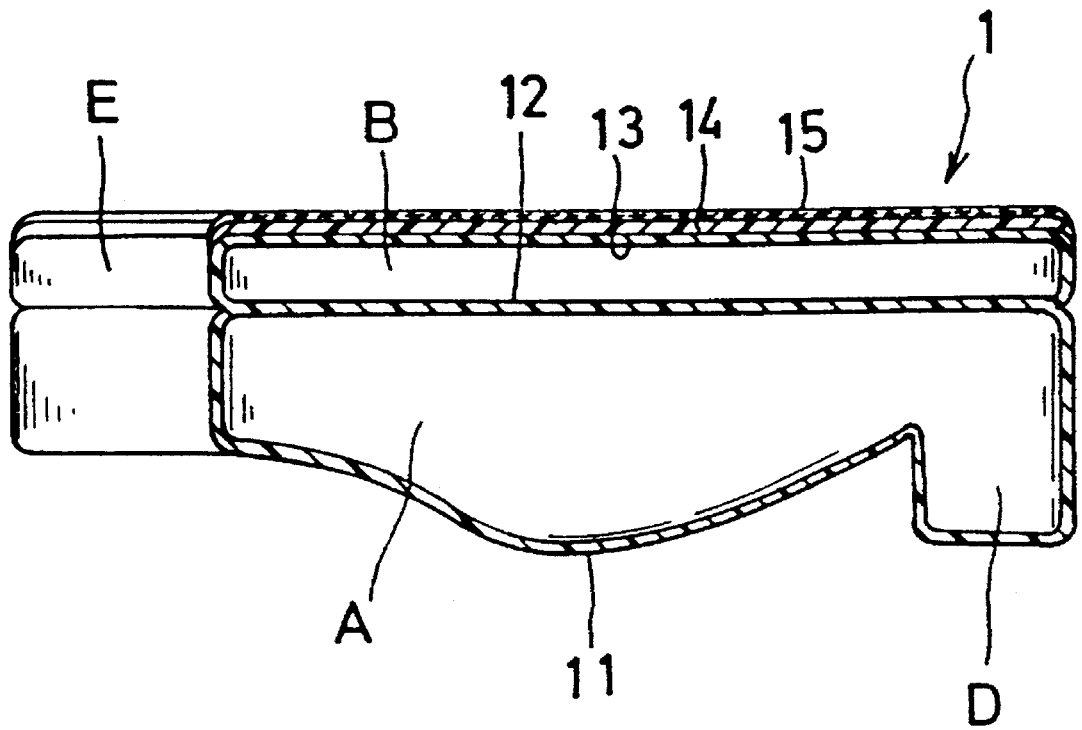
FIG. 2 is a sectional view of the present invention.
Figure 3:
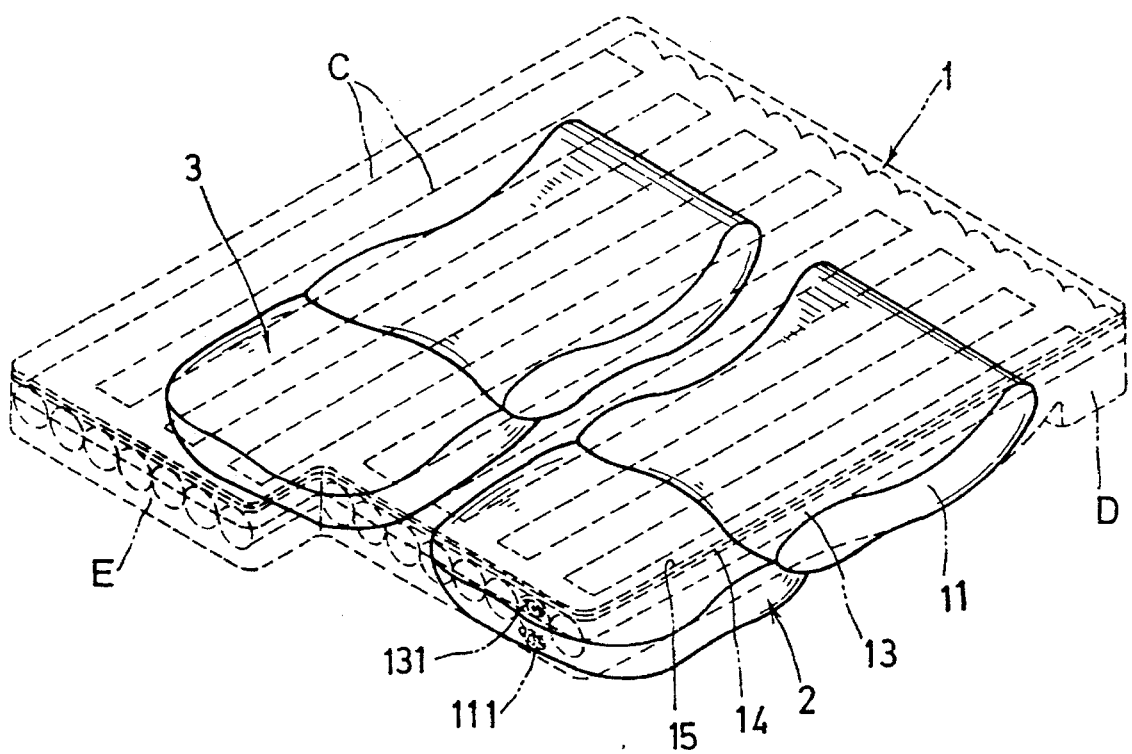
FIG. 3 is a diagram showing the present invention in practical use.

As shown in FIGS. 1, 2 and 3, the present invention relates to air cushion 1 for sleeping in a car, including a plastic lower layer 11, a plastic intermediate layer 12, a plastic upper layer 13, a plastic mattress 14, and a flannel cloth 15, having a plurality of edge portions of the layers 11, 12, 13, the mattress 14 and the cloth 15 fastened together by adhesive. The plastic lower layer 11 and the double layer 12 form a chamber A, while the plastic intermediate layer 12 and upper layer 13 define a chamber B which is separated from the chamber A without air circulation between the two chambers A, B. Two valves 111, 131 are each formed on a side portion of the plastic lower layer 11 and the plastic upper layer 13. A plurality of air chambers C are formed in between the plastic intermediate layer 12 and the plastic upper layer 13. The plastic lower layer 11 is designed in conformance to the shape of the car seats and the area of the air cushion 1 is made to cover the surface of the driver's seat 2 and the passenger's seat 3. A seat holding portion D is protruded rearwardly downwardly from a rear portion of the air cushion 1 while a rectangular extension portion E is protruded forwardly from a front portion of the air cushion adjacent to a front end of the passenger's seat 3 as shown in FIGS. 1 and 2.

When using the air cushion 1, the driver's seat 2 and the passenger's seat 3 of a car are flattened and the headrests are removed. With an air blower or with manual blowing, air can be inflated through the valves 111, 131 into the chambers A and B of the air cushion 1. The chamber A must be inflated completely so that the air pressure in the Chamber A can make a close contact between the plastic lower layer and the car seats for stably resting the air cushion on the car seats, while the internal pressure in chamber B can be adjusted in order to vary the softness of the air cushion 1 according to personal habits of the users. When the air cushion 1 is fully inflated, the seat holding portion D can be engaged with the upper ends of the driver's seat 2 and the passenger's seat 3 to prevent inclination of the air cushion 1 and the rectangular extension portion E of the air cushion disposed at the end of the passenger's seat can offer an extra space for the stretching of the feet. Thus, when inflated with air, the air cushion 1, made to cover the area from the driver's seat to the passenger's seat, will extend from said driver's seat to said passenger's seat to provide an enlarged and flat surface for sleeping as shown in FIG. 3.

Because of the partition of the plastic lower layer 11 and upper layer 13 by the plastic intermediate layer 12, the fully inflated chamber A will make the plastic lower layer 11 stably supported in place upon the car seats 2, 3, while the air pressure in the chamber B can be optionally adjusted according to the personal habits to vary the softeness of the sleeping surface of the plastic upper layer 13. Furthermore, the plastic upper layer 13 is covered with a plastic mattress 14 and a flannel cloth 15 so that the users can sleep comfortably on the flat surface of the flannel cloth 15 without direct contact with the plastic mattress.

What is claimed is:

1. An air cushion for sleeping in a car comprising a plastic lower layer, a plastic intermediate layer, a plastic upper layer, a plastic mattress, and a flannel cloth, having an edge portion of each said layer, said plastic mattress and said flannel cloth fastened together;

the plastic lower layer and the plastic intermediate layer forming a first chamber (A), and the plastic intermediate layer and the plastic upper layer forming a second chamber (B) which is positioned above and separated from the first chamber (A) without air circulation between said first and second chambers, having a plurality of air chambers formed in between said intermediate layer add said upper layer;

a valve formed on each side portion of the plastic lower layer and the plastic upper layer for inflating and deflating said first and second chambers;

the plastic lower layer engageable with at least a car seat so that when said first chamber is fully inflated, said plastic lower layer is stably retained upon the car seat;

a seat holding portion protruding rearwardly downwardly from the air cushion for retaining an end portion of said car seat when flattened;

a rectangular extension portion protruding forwardly from the air cushion adjacent to a front end of a passenger's seat beside a driver's seat to provide a space for stretching a user's feet; and said air cushion having an area covering the driver's seat and the passenger's seat to provide an enlarged and comfortable flat sleeping space.

* * * * *